United States Patent
Zhang et al.

(10) Patent No.: US 12,276,305 B2
(45) Date of Patent: Apr. 15, 2025

(54) BEARING SEAL AND ITS APPLICATIONS

(71) Applicant: Aktiebolaget SKF, Gothenburg (SE)

(72) Inventors: Meng Zhang, Datong (CN); Dapeng Li, Shenyang (CN); Yangguang Zhao, Xinchang county (CN); He Zhu, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 99 days.

(21) Appl. No.: 17/991,372

(22) Filed: Nov. 21, 2022

(65) Prior Publication Data

US 2023/0204072 A1    Jun. 29, 2023

(30) Foreign Application Priority Data

Dec. 23, 2021    (CN) .......................... 202111586981.9

(51) Int. Cl.
*F16C 33/76*     (2006.01)
*F16C 19/06*     (2006.01)
*F16C 33/78*     (2006.01)

(52) U.S. Cl.
CPC ............ *F16C 33/762* (2013.01); *F16C 19/06* (2013.01); *F16C 33/7883* (2013.01)

(58) Field of Classification Search
CPC ............... F16C 33/782; F16C 33/7879; F16C 33/7883; F16C 33/805; F16J 15/3256
See application file for complete search history.

(56) References Cited

U.S. PATENT DOCUMENTS

| | | | |
|---|---|---|---|
| 2004/0080113 A1* | 4/2004 | Linden ................ | F16C 33/7879 277/412 |
| 2011/0089642 A1* | 4/2011 | Terasawa ............. | F16C 41/007 277/562 |
| 2012/0207417 A1* | 8/2012 | Walter ................. | F16J 15/3264 277/411 |
| 2021/0115974 A1* | 4/2021 | Schamin .............. | F16C 41/002 |

* cited by examiner

*Primary Examiner* — James Pilkington
(74) *Attorney, Agent, or Firm* — GARCIA-ZAMOR INTELLECTUAL PROPERTY LAW, LLC; Ruy Garcia-Zamor

(57) ABSTRACT

A bearing seal for a rolling bearing with standard boundary dimensions that comprises a first flinger fitted into a first bearing ring and a second flinger fitted into a second bearing ring. Each flinger further comprises a correspondingly numbered sealing body. A first sealing body engages the second flinger and/or the second bearing ring, and a second sealing body engages the first flinger and/or the first bearing ring. The axial width of the bearing seal varies along the radial direction of the bearing. Starting at the first bearing ring, with a narrow width W, defined relative to the total radial size of the bearing seal L, wherein the ratio W/L is less than or equal to 0.5, the bearing seal widens toward the second bearing ring, thereby providing extra space between the rolling elements and/or cage and the bearing seal adjacent to the first bearing ring.

8 Claims, 2 Drawing Sheets

BEARING SEAL AND ITS APPLICATIONS

CROSS-REFERENCE TO RELATED APPLICATIONS

This application claims priority to Chinese Patent Application no. 202111586981.9, filed Dec. 23, 2021, the contents of which is fully incorporated herein by reference.

TECHNICAL FIELD

The invention relates to a bearing seal and a roller bearing employing such seal.

BACKGROUND ART

Bearing seals are essential for retaining lubricant, isolating contaminants, and extending the life of bearings. However, due to boundary size limitations, standard bearings of general purpose models are generally only equipped with simple seals with conventional protection capability, making it difficult to use seals of complex structure with better sealing performance but larger dimensions. For example, conventional deep groove ball bearings are usually equipped with conventional types of dust shields. Such shields use non-contact gap seals, which is difficult to meet the requirements imposed by heavy pollution environment on the seal. In order to meet a higher level of protection requirements, users have to add additional protection measures to the existing bearings, which not only causes an increase in equipment costs, but also brings a lot of inconvenience to the use and maintenance.

The reality calls for a bearing seal that is compact enough to fit in a standard boundary size bearing without losing good sealing performance.

SUMMARY OF THE INVENTION

To resolve the above problems, the present invention provides a bearing seal comprising a first flinger capable of being secured to a shoulder on one side of a first bearing ring and a second flinger capable of being secured to a shoulder on the same side of a second bearing ring, wherein a first sealing body formed on the first flinger is configured to form sealing engagement with a corresponding surface of the second flinger and/or the second bearing ring, and a second sealing body formed on the second flinger is configured to form sealing engagement with the corresponding surface of the first flinger and/or the first bearing ring. The seal has a lean structure formed at least within a partial scope on a side thereof that faces the rolling elements and/or the cage, which lean structure allows axial space to be released to the interior of the bearing, such that a ratio W/H of the axial size W within the partial scope of the seal to the spacing H between the first and second bearing ring shoulders falls within a range of W/H≤0.50.

The above-mentioned seals are based on a partial or integral "slim" structure, allowing previously good but complex seals to be used in standard bearings with limited boundary dimensions, thus overcoming the previous technical bottleneck of using only small, lightly protected seals in standard bearings, and allowing standard bearings to be used directly in heavily contaminated applications without additional protection.

On the basis of the above-mentioned seal, the present invention also provides a rolling bearing having standard boundary dimensions, the bearing being provided with the bearing seal on an axial side thereof. Here, the standard boundary dimensions, for example, may be the boundary dimensions specified for a standard type of bearing, including but not limited to the dimensions of the bearing's inner diameter, outer diameter, width, etc.

The above-mentioned standard bearings can achieve improved sealing performance without changing the boundary dimensions of the bearings, thus significantly expanding their range of application while maintaining the versatility of the bearings. For example, the bearings can be used directly in heavily contaminated environments, fundamentally avoiding the need for additional protective measures by the users and the resulting increased costs.

The various embodiments and beneficial technical effects of the present invention will be described in detail below with reference to the accompanying drawings.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings.

DETAILED DESCRIPTION OF EMBODIMENTS

Figure 1:
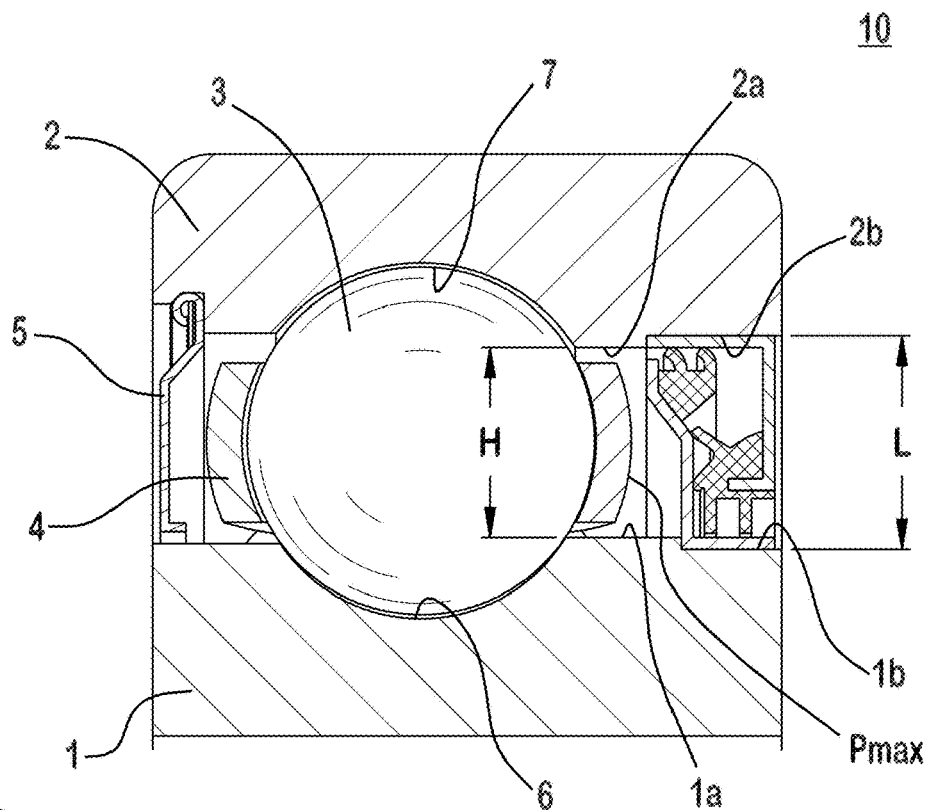
FIG. 1 shows a schematic cross-section of a rolling bearing equipped with an improved seal of the present invention on the right side.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20) degrees, provides specific literal support for any angle greater than twenty (20) degrees, such as twenty-three (23) degrees, thirty (30) degrees, thirty-three-point five (33.5) degrees, forty-five (45) degrees, fifty-two (52) degrees, or the like and thus provides support for claiming a preferred embodiment with the element moving along the arcuate path thirty-three-point five (33.5) degrees. FIG. 1 shows a schematic cross-sectional view of a rolling bearing equipped with an improved seal of the present invention on the right side thereof. In the specific embodiment shown, the rolling bearing 10 comprises an inner ring 1, an outer ring 2, a plurality of rolling 20 elements 3 provided between the inner ring raceway 6 and the outer ring raceway 7, and a cage 4 that ensures that the rolling elements 3 are circumferentially spaced at prescribed intervals.

FIG. 1 shows a schematic cross-sectional view of a rolling bearing equipped with an improved seal of the present invention on the right side thereof. In the specific embodiment shown, the rolling bearing 10 comprises an inner ring 1, an outer ring 2, a plurality of rolling elements 3 provided between the inner ring raceway 6 and the outer ring raceway 7, and a cage 4 that ensures that the rolling elements 3 are circumferentially spaced at prescribed intervals. The dust shield 5 provided on the left side of the bearing 10 is a light sealing guard routinely used for standard bearings in the prior art.

Figure 2:
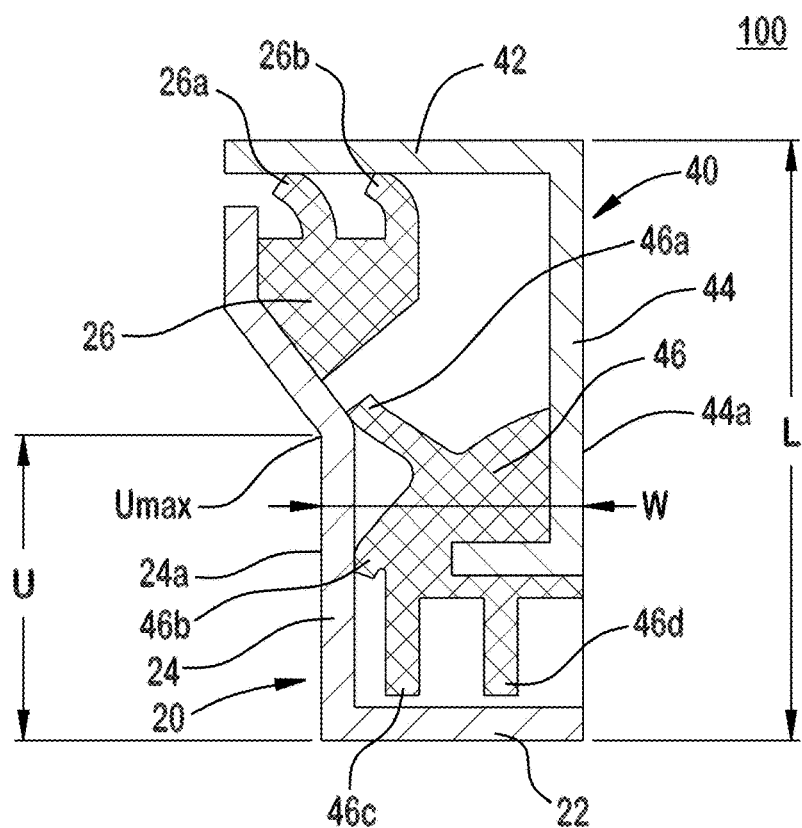
FIG. 2 shows a partial enlarged view of the right side seal in FIG. 1.

FIG. 2 is a partial enlarged view of the right side seal in FIG. 1. The seal 100 is typically a cassette seal (but not limited to such type of seal), comprising in general an inner flinger 20 capable of being securely fastened to an inner ring shoulder 1a and an outer flinger 40 capable of being securely fastened to an outer ring shoulder 2a. The inner flinger 20 includes, for example, an axial portion 22 that can be assembled by a tight fit in an inner ring shoulder recess 1b and a radial portion 24 that can radially block lubricant leakage from the inside of the bearing to the outside. The outer flinger 40 includes, for example, an axial portion 42 that can be assembled by a tight fit in an outer ring shoulder recess 2b and a radial portion 44 that can block external contaminants from entering the interior of the bearing.

In the particular embodiment shown in FIG. 2, the radial portion 24 of the inner flinger 20 has a recessed structure U on a side thereof facing the rolling elements 3/cage 4, so that the seal 100 has a partially "slim" cross-sectional profile and thus a small axial dimension (hereinafter referred to as "thickness") W in the radial direction corresponding to the local extent of the recessed structure U. Specifically, the thickness W, as shown in FIG. 2, is defined by the left side surface 24a of the inner flinger radial portion 24 and the right side surface 44a of the outer flinger radial portion 44. In the present invention, the ratio of the thickness W to the spacing H between the bearing inner and outer ring shoulders (herein after referred to as "bearing shoulder spacing" or "shoulder spacing") is defined as the "width-to-height ratio" to describe the proportionality of the thickness of the seal at least locally in its radial direction relative to the bearing shoulder spacing. It is not difficult to understand that with a constant shoulder spacing H, a larger the width-to-height ratio indicates a thicker seal and a smaller the width-to-height ratio indicates a less thick seal.

In the particular aspect shown in FIGS. 1 and 2, the radial portion 24 of the inner flinger 20 may have a seal body 26 formed on the radial outer side thereof (i.e., above in the Figures). The seal body 26 may be made of an elastomeric material such as normal rubber, low friction rubber or polytetrafluoroethylene (PTFE), and the sealing lips 26a, 26b that may extend from this seal body 26 may form a contact seal by frictional fit to the inner surface (not marked in the Figures) of the axial portion 42 of the outer flinger 40 and/or the outer ring 2. Similarly, the radial portion 44 of the outer flinger 40 may have a seal body 46 formed on the radial inner side thereof (i.e., below in the Figures) which may extend four sealing lips 46a, 46b, 46c, and 46d. Among these four lips, the axial sealing lips 46a and 46b may form a contact seal with the radial portion 24 of the inner flinger 20 by friction fit, and the radial sealing lips 46c and 46d may form a non-contact seal with the upper surface (not marked in the Figures) of the axial portion 22 of the inner flinger 20 and/or the inner ring 1 by gap fit. In the specific aspect shown in FIGS. 1 and 2, the sealing lips 26a and 26b may form a contact seal by frictional fit with the axial portion 42 of the outer flinger 40; and sealing lips 46c and 46d may form a non-contact seal with the axial portion 22 of the inner flinger 20 by gap fit.

Figure 3:
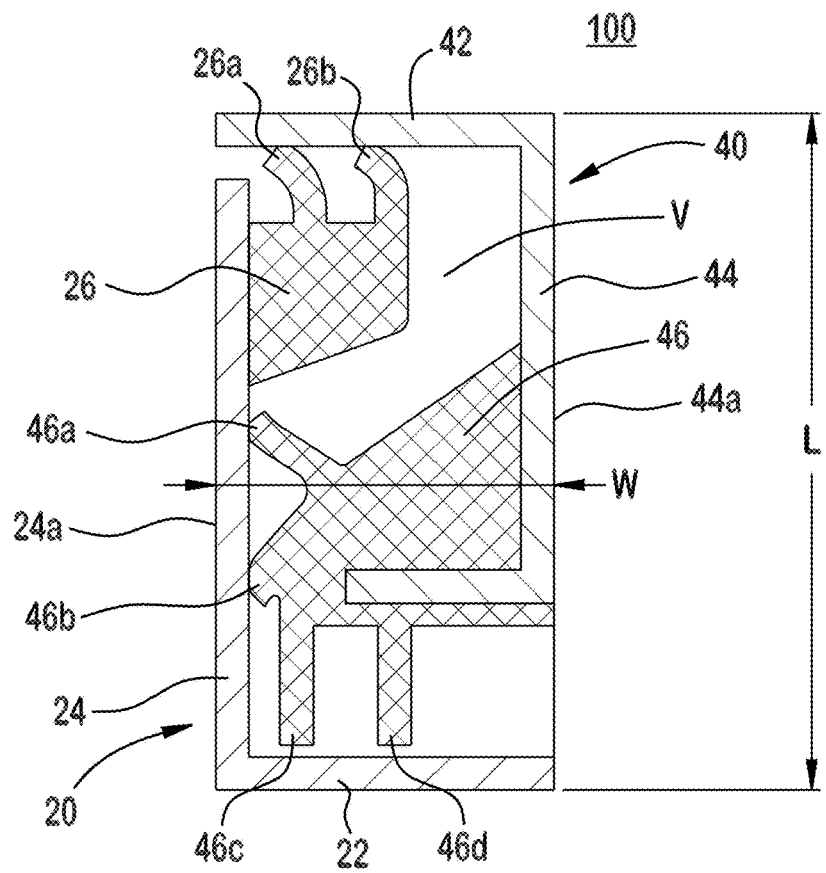
FIG. 3 shows a schematic cross-section of an alternative embodiment of an improved seal of the present invention.
Figure 4:
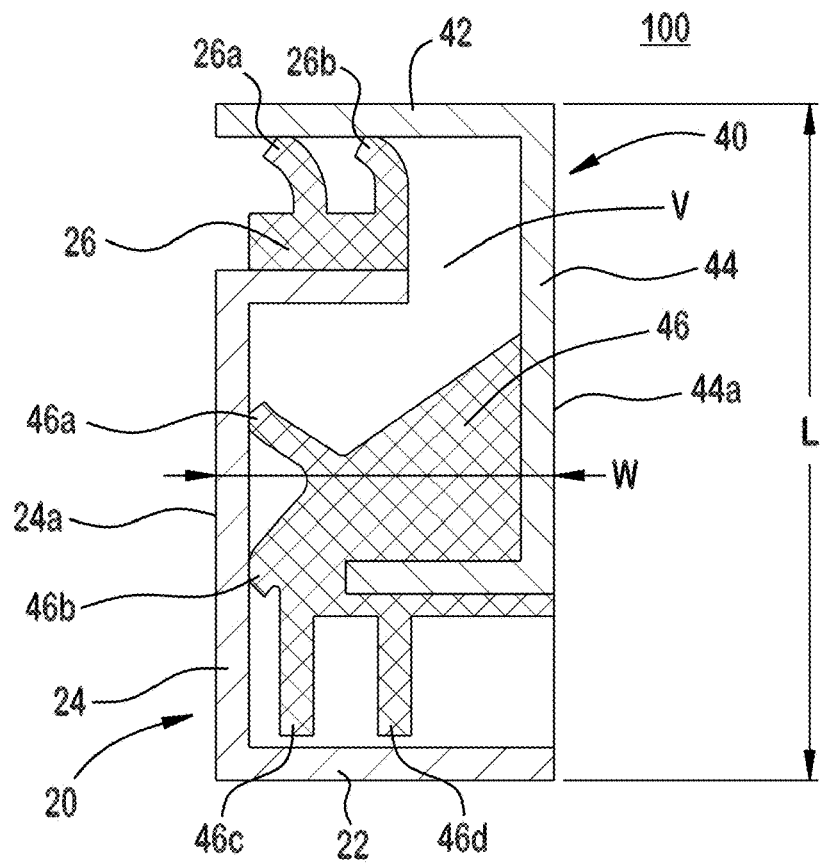
FIG. 4 shows a schematic cross-section of a still alternative embodiment of an improved seal of the present invention.

In contrast to the cross-sectional morphology of the partial slim structure shown in FIG. 2, FIGS. 3 and 4 show that the seal 100 has the thickness distribution of an overall slim structure. In the particular embodiment shown in FIGS. 3 and 4, the inner flinger 20 has a substantially L-shaped cross-sectional shape, the radial portion 24 of which has a flat structure extending throughout the radial direction such that the thickness W of the seal 100 remains substantially uniform throughout the radial direction. Compared to the partial slim structure shown in FIG. 2, this overall slim structure clearly facilitates the yielding of more axial space, thus allowing the bearing to gain more internal space.

Regardless of the form of the slim structure, the width-to-height ratio W/H of seal 100 as defined above should not exceed 0.50. In a preferred embodiment, the width-to-height ratio W/H does not exceed 0.40. In a further preferred embodiment, the width-to-height ratio W/H does not exceed 0.35. In a still further preferred embodiment, the width-to-height ratio W/H does not exceed 0.25. In addition, the percentage of the entire radial size L (hereinafter referred to as the "lean percentage") of the seal 100 that meets the above width-to-height ratio conditions is at least 50%. In a preferred case, the lean percentage is desirably above 75%. In a further preferred case, the lean percentage is desirably above 80%. In an extreme case, the lean percentage can reach 100%, thus forming the overall lean structure shown in FIGS. 3 and 4, as described in further detail later.

The lean structure described above has several benefits. First, allowing otherwise a wide seal (typically a cassette seal) to be used in a standard bearing with limited boundary dimensions (especially axial boundary dimensions), thus giving the standard bearing a wide seal option that was previously difficult to use: Secondly, the axial space thus released can be given over to the internal use of the bearing, for example, to increase the diameter of the rolling elements, thereby increasing the bearing's load carrying capacity, or to accommodate more lubricant, thereby improving bearing lubrication.

In the case where a recessed structure is used, the location of the deepest part of the recess Umax may correspond in the radial direction to the axial protrusion Pmax of the rolling elements 3 and/or the cage 4. On the one hand, the seal 100 tends to naturally form a groove structure in the deepest part of the recess, which particularly facilitates the retention of lubricant and thus improves lubrication at the protrusion places where friction is most intense: On the other hand, the deepest part of the recess also creates a safety distance compatible with the protrusion, thus allowing a greater displacement, deformation and/or vibration amplitude of the rolling elements/cage. These features can further expand the adaptability of the seal to different types of cages.

In the particular embodiment shown in FIGS. 3 and 4, the radial portion 24 of the inner flinger 20 has a seal body 26 formed on the radial outer side thereof (i.e., above in the Figures). The seal body 26 is made of an elastomeric material such as normal rubber, low friction rubber or polytetrafluoroethylene (PTFE), and the sealing lips 26a, 26b extending from this seal body 26 form a contact seal by frictional fit to the inner surface (not marked in the Figures) of the axial portion 42 of the outer flinger 40 or the outer ring 2. Similarly, the radial portion 44 of the outer flinger 40 has a seal body 46 formed on the radial inner side thereof (i.e., below in the Figures) which extends four sealing lips 46a, 46b, 46c, and 46d. Among these four lips, the axial sealing lips 46a and 46b form a contact seal with the radial portion 24 of the inner flinger 20 by friction fit, and the radial sealing lips 46c and 46d form a non-contact seal with the upper surface (not marked in the Figures) of the axial portion 22 of the inner flinger 20 or the inner ring 1 by gap fit.

Since the seal 100 adopts an overall slim structure, with the seal body 26 of the inner flinger 20 and the seal body 46 of the outer flinger 40 roughly overlapping in the axially direction and being in the radial direction on the outer and inner sides (i.e., the upper and lower sides in the Figures) of the enclosed space V of the inner and outer flingers, respectively, the space utilization of the enclosed space V can be improved, which further reduces the space occupied by the enclosed space V inside the bearing.

In general, contact seals are more effective than non-contact seals, but contact friction reduces transmission efficiency and causes temperature rise effects. Therefore, the way of contacting and the number of the sealing lips should be determined according to the needs of the application and are not limited by the embodiments shown.

The above slim structure allows the previous wide and thick heavy contamination protection seals to be used in standard bearings with limited boundary dimensions (especially axial boundary dimensions), which not only significantly improves the protection capability of the bearings, but also avoids the reset of the bearing boundary dimensions by custom design, thus perfectly maintaining the advantages of the standard bearings based on constant boundary dimensions for versatility. Therefore, a general-purpose bearing with the slim structure seal of the present invention can be used to replace a standard bearing of the equivalent type, which has a high practical replacement and a wide application prospect.

It can also be seen from the above description that, for a constant width-to-height ratio W/H, there is a positive correlation between the thickness W of the seal and the shoulder spacing H. Thus, reducing the shoulder spacing H can further compress the thickness W of the seal. On the basis of the above concept, the rolling bearing 10 can have spacing between inner and outer ring shoulders on the side where the seal 100 is located smaller than on the other side of the bearing, as shown in FIG. 1, thus obtaining a smaller shoulder spacing H than in the conventional case. The reduced shoulder spacing H facilitates the construction of a seal with a smaller thickness W, thus further yielding the axial space of the seal to the internal space of the bearing. Not only that, but the reduced shoulder spacing H also means a reduced window area between the bearing and the external environment. This is equivalent to reducing the diameter of the passage for external contaminants to enter the inside of the bearing, thus limiting the amount of contaminants that can enter the inside of the bearing.

As a specific embodiment, as shown in FIG. 1, the bearing races 6, 7 can be offset to one side of the bearing (left side in the Figure) and thus away from the seal 100 on the other side of the bearing (right side in the Figure). This solution balances the spacing distance between the rolling elements and/or cage and the seals on either side by rearranging the distribution of the internal space of the bearing so that the rolling elements and/or cage is as centrally located in the internal space of the bearing as possible in the axial direction. In the embodiment shown in FIG. 1, the left side of the bearing may have a light protective seal, for example, a dust shield 5, and the right side of the bearing may have a heavy protective seal, for example, the improved slim seal 100 of the present invention. This asymmetrical seal layout can be perfectly adapted to bearing applications with light contamination on one side and heavy contamination on the other.

It should be understood by those skilled in the art that the above bearing seals and their applications are not limited by the specific embodiments and that the more general technical solutions will be subject to the limitations of the accompanying claims. Any changes and modifications to the present invention are within the scope of protection of the present invention, provided they conform to the limitations of the accompanying claims.

The invention claimed is:

1. A bearing seal comprising:
    a first flinger configured to be secured to a first shoulder of a first bearing ring on an axial side of a bearing, the first flinger comprising a first axial portion and a first radial portion, and
    a second flinger configured to be secured to a second shoulder of a second bearing ring on the axial side of the bearing, the second flinger comprising a second axial portion and a second radial portion, and
    a first sealing body formed on the first flinger comprising a first plurality of lips, one lip of the first plurality of lips forming a contact seal with the second flinger,
    a second sealing body formed on the second flinger comprising a second plurality of lips, one lip of the second plurality of lips forming a contact seal with the first flinger and another lip of the second plurality of lips forming a non-contact seal with the first flinger,
    wherein the first radial portion comprising a first segment and a second segment, the first segment being axially closer to the second radial portion than the second segment, and
    wherein the first segment of the first radial portion is located within an axial distance W of the second radial portion, and
    wherein a total radial size L of the bearing seal is measured between the first axial portion of the first flinger and the second axial portion of the second flinger.

2. The bearing seal according to claim 1, wherein the first segment of the first radial portion is located within the axial distance W of the second radial portion such that $W/L \leq 0.50$.

3. The bearing seal according to claim 2, wherein the first segment of the first radial portion is located within the axial distance W of the second radial portion such that $W/L \leq 0.35$.

4. The bearing seal according to claim 1, wherein the first segment of the first radial portion extending radially from the first axial portion to at least 50% but not more than 75% of the total radial size L of the bearing seal.

5. The bearing seal according to claim 1, wherein the first segment of the first radial portion extending radially from the first axial portion to at least 75% but not more than 85% of the total radial size L of the bearing seal.

6. A rolling bearing, provided on an axial side thereof with a bearing seal comprising:
    a first flinger secured to a first shoulder of an inner ring on the axial side of the bearing, the first flinger comprising a first axial portion and a first radial portion, and a second flinger secured to a second shoulder of an outer ring on the axial side of the bearing, the second flinger comprising a second axial portion and a second radial portion, and a first sealing body formed on the first flinger comprising a first plurality of lips, one lip of the first plurality of lips forming a contact seal with the second flinger, a second sealing body formed on the second flinger comprising a second plurality of lips, one lip of the second plurality of lips forming a contact seal with the first flinger and another lip of the second plurality of lips forming a non-contact seal with the first flinger, wherein the first radial portion comprising a first segment and a second segment, the first segment being axially closer to the second radial portion than the second segment.

7. The rolling bearing according to claim 6, wherein the bearing further comprises a third shoulder on the inner ring and a fourth shoulder on the outer ring on an opposite axial side of the bearing from the axial side, wherein a radial spacing between the first shoulder and the second shoulder is smaller than a radial spacing between the third shoulder and the fourth shoulder.

8. The rolling bearing according to claim 7, wherein raceways are axially positioned closer to the opposite axial side than to the axial side of the bearing.

* * * * *